United States Patent
Kobayashi et al.

(10) Patent No.: US 6,727,979 B2
(45) Date of Patent: Apr. 27, 2004

(54) PROJECTION ALIGNER

(75) Inventors: Yoshinori Kobayashi, Tokyo (JP); Shigetomo Ishibashi, Tokyo (JP); Masato Hara, Tokyo (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/339,301

(22) Filed: Jan. 10, 2003

(65) Prior Publication Data

US 2003/0133089 A1 Jul. 17, 2003

(30) Foreign Application Priority Data

Jan. 11, 2002 (JP) ........................................ 2002-005409

(51) Int. Cl.⁷ ........................ G03B 27/42; G03B 27/52; G03B 27/54; G01B 11/00
(52) U.S. Cl. .............................. 355/53; 355/55; 355/67; 356/401
(58) Field of Search .............................. 355/52, 53, 55, 355/67; 356/399, 400, 401; 359/727

(56) References Cited

U.S. PATENT DOCUMENTS

| | | | |
|---|---|---|---|
| 5,026,145 A | | 6/1991 | Marui et al. |
| 5,062,692 A | | 11/1991 | Marui et al. |
| 5,078,474 A | | 1/1992 | Marui et al. |
| 5,625,436 A | * | 4/1997 | Yanagihara et al. .......... 355/53 |
| 5,729,331 A | | 3/1998 | Tanaka et al. |
| 5,777,722 A | | 7/1998 | Miyazaki et al. |
| 6,018,384 A | | 1/2000 | Ota |
| 6,157,497 A | | 12/2000 | Kumazawa |
| 6,236,448 B1 | | 5/2001 | Ota |
| 6,249,336 B1 | | 6/2001 | Ota |
| 6,351,305 B1 | | 2/2002 | Tanaka et al. |
| 6,388,735 B1 | | 5/2002 | Ota |
| 2003/0095339 A1 | * | 5/2003 | Kobayashi et al. .......... 359/726 |
| 2003/0117602 A1 | * | 6/2003 | Kobayashi et al. .......... 355/53 |
| 2003/0117603 A1 | * | 6/2003 | Kobayashi et al. .......... 355/53 |
| 2003/0117604 A1 | * | 6/2003 | Kobayashi et al. .......... 355/55 |
| 2003/0117607 A1 | * | 6/2003 | Kobayashi et al. .......... 355/67 |

FOREIGN PATENT DOCUMENTS

| | | |
|---|---|---|
| JP | 4935453 | 9/1974 |
| JP | 7135165 | 5/1995 |
| JP | 10242040 | 9/1998 |

OTHER PUBLICATIONS

English Language Translation of JP Appln. No. 49–35453.
English Language Translation of JP Appln. No. 7–135165.
English Language Translation of JP Appln. No. 10–242040.

* cited by examiner

Primary Examiner—Alan Mathews
(74) Attorney, Agent, or Firm—Greenblum & Bernstein, P.L.C.

(57) ABSTRACT

The projection aligner transfers the image of the pattern formed on the mask to the object by scanning a light beam across the mask and the object. The projection aligner includes a driving mechanism for synchronously moving the mask and the object and thereby scanning the light beam across the mask and the object in a predetermined beam scanning direction. The light beam scanning the mask passes through the mask and is projected onto the object by a projection optical system of which magnification is adjusted by a magnification adjusting mechanism. The magnification adjusting mechanism and the driving mechanism are controlled by a controller such that the difference between the magnification of said projection optical system and a velocity ratio of the mask and the object moved by the driving mechanism becomes below a predetermined maximum value which is determined based on a line width of the pattern formed on the mask.

10 Claims, 11 Drawing Sheets

PROJECTION ALIGNER

BACKGROUND OF THE INVENTION

Figure 1:
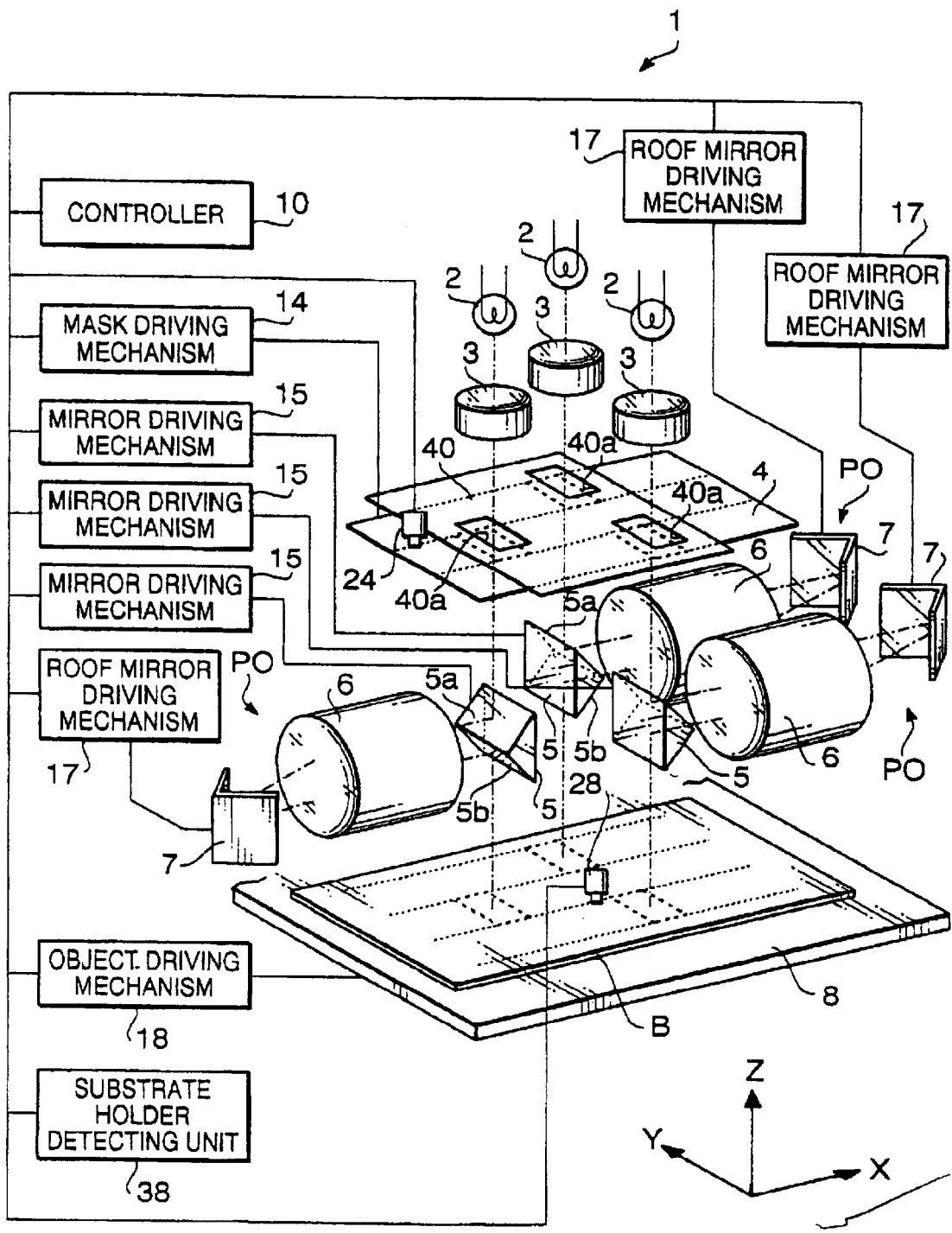

The present invention relates to a projection aligner that transfers a pattern formed on a mask to an object to be exposed by scanning a light beam across the mask and the object.

Projection aligners have been used to form wiring patterns of PCBs (Printed Circuit Boards), for example. Such projection aligners typically include light sources emitting light beams toward the mask, projection optical systems for projecting respective light beams passed through the mask to the object such as the substrate of the PCB, and a driving mechanism that moves the mask and the object such that the light beams scan across the mask and the object.

Since the size of the object changes due to, for example, temperature variation of the atmosphere, the projection aligner is configured so as to be capable of adjusting the size of the image of the mask pattern projected onto the object in accordance with the size change of the object, so that the image can be transferred to a correct location on the object.

The size of the image is magnified by changing the magnification of the projection optical system as well as adjusting the velocities of the mask and the object moved by the driving mechanism. If the image of the mask pattern transferred to the object should be enlarged for 1%, for example, the projection optical system is adjusted at ×1.01 magnification and the mask and the object are moved so that the velocity of the object is 1% higher than that of the mask.

In many cases, however, the expansion/contraction ratio of the object varies with direction. For example, the expansion/contraction ratios in the direction in which the light beams are scanned over the object (which will be referred to hereinafter as "beam scanning direction"), and in the direction perpendicular to the beam scanning direction are often not the same. In such cases, in order to transfer the mask pattern to the correct location on the object, the magnification of the mask pattern image projected onto the object should be changed between the beam scanning direction and the direction perpendicular thereto.

The above can be achieved by appropriately controlling the velocities of the mask and the object moved by the driving mechanism. For example, if the object is driven such that its velocity is 2% higher than that of the mask, while adjusting the projection optical system at ×1.01 magnification, the image of the mask pattern on the object is enlarged for 2% in the beam-scanning direction and for 1% in the direction perpendicular to the main scanning direction.

However, when the image of the mask pattern is enlarged/reduced in the beam scanning direction into a size different from that of the image magnified by the projection optical system, the mask pattern formed to the photosensitive layer on the object becomes to have blurred lines. These blurred lines are undesirable since they cause the lines obtained on the object after development and etching processes to become thinner than a required width.

SUMMARY OF THE INVENTION

The present invention is advantageous in that a projection aligner is provided that is capable of transferring an image of a pattern formed on a mask to an object at different magnifications in different directions without causing the transferred image being significantly blurred.

According to an aspect of the invention, the projection aligner transfers the image of the pattern formed on the mask to the object by scanning a light beam across the mask and the object. The projection aligner, includes a driving mechanism for synchronously moving the mask and the object to scan the light beam across the mask and the object in a predetermined beam scanning direction. The light beam scanning the mask passes through the mask and is projected onto the object by a projection optical system of which magnification is adjusted by a magnification adjusting mechanism. The magnification adjusting mechanism and the driving mechanism are controlled by a controller such that the difference between the magnification of the projection optical system and a velocity ratio of the mask and the object moved by the driving mechanism becomes below a predetermined maximum value which is determined based on a line width of the pattern formed on the mask.

For example, the controller adjusts the magnification Mgn of the projection optical system and the velocity ratio $\alpha$ of the mask and the object to (i) $(SR1+SR2+A)/2$ and $(SR1+SR2-A)/2$, respectively, when $(SR1-SR2)>A$, (ii) $SR1$ and $SR2$, respectively, when $|SR1-SR2|\leq A$, and (iii) $(SR1+SR2-A)/2$ and $(SR1+SR2+A)/2$, respectively, when $(SR1-SR2)<-A$, where $SR1$ and $SR2$ represent size ratios of the object to the mask in the beam scanning direction and a direction perpendicular to the beam scanning direction, respectively, and $A$ represents the predetermined maximum value.

In the projection aligner configured as above, the image of the mask pattern transferred to the object does not become significantly blurred even if the image is transferred to the object with different expansion ratios in the beam scanning direction and a direction perpendicular to the beam scanning direction since the difference between the optical system magnification and the object-mask velocity ratio, which determines the degree of the blur, is kept below the predetermined maximum value.

Optionally, the projection aligner includes first and second cameras for capturing images of the object and the mask, respectively, and the controller calculates the size ratios mentioned above from the images captured by the first and second cameras. In such cases, each of the mask and the object may be provided with at least two first marks arranged thereon along the beam scanning direction and at least two second marks arranged thereon along the direction perpendicular to the beam scanning direction. If such marks are provided to the mask and the object, the controller can measure the size of each of the mask and the object in both the beam scanning direction and the direction perpendicular to the beam scanning direction based on the positions of the first and second marks in the images captured by the first and second cameras.

In some embodiments of the invention, the projection optical system includes, a lens unit having a positive power, a first mirror that deflects the light beam passed through the mask toward the lens unit, a reflector that reflects back the light beam deflected by the first mirror and passed through the lens unit, and a second mirror that deflects the light beam reflected by the reflector and passed through the lens unit toward the object. In the projection optical system configured as above, the magnification thereof can be varied by moving the reflector along an optical axis of the lens unit, and also moving the first and second mirrors toward and away from the object.

BRIEF DESCRIPTION OF THE ACCOMPANYING DRAWINGS

Figure 2:
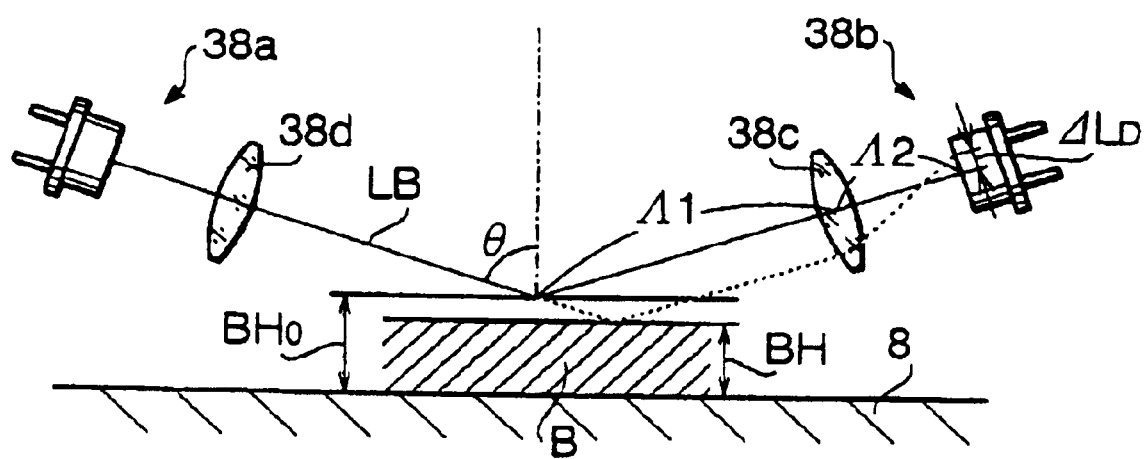
Figure 3:
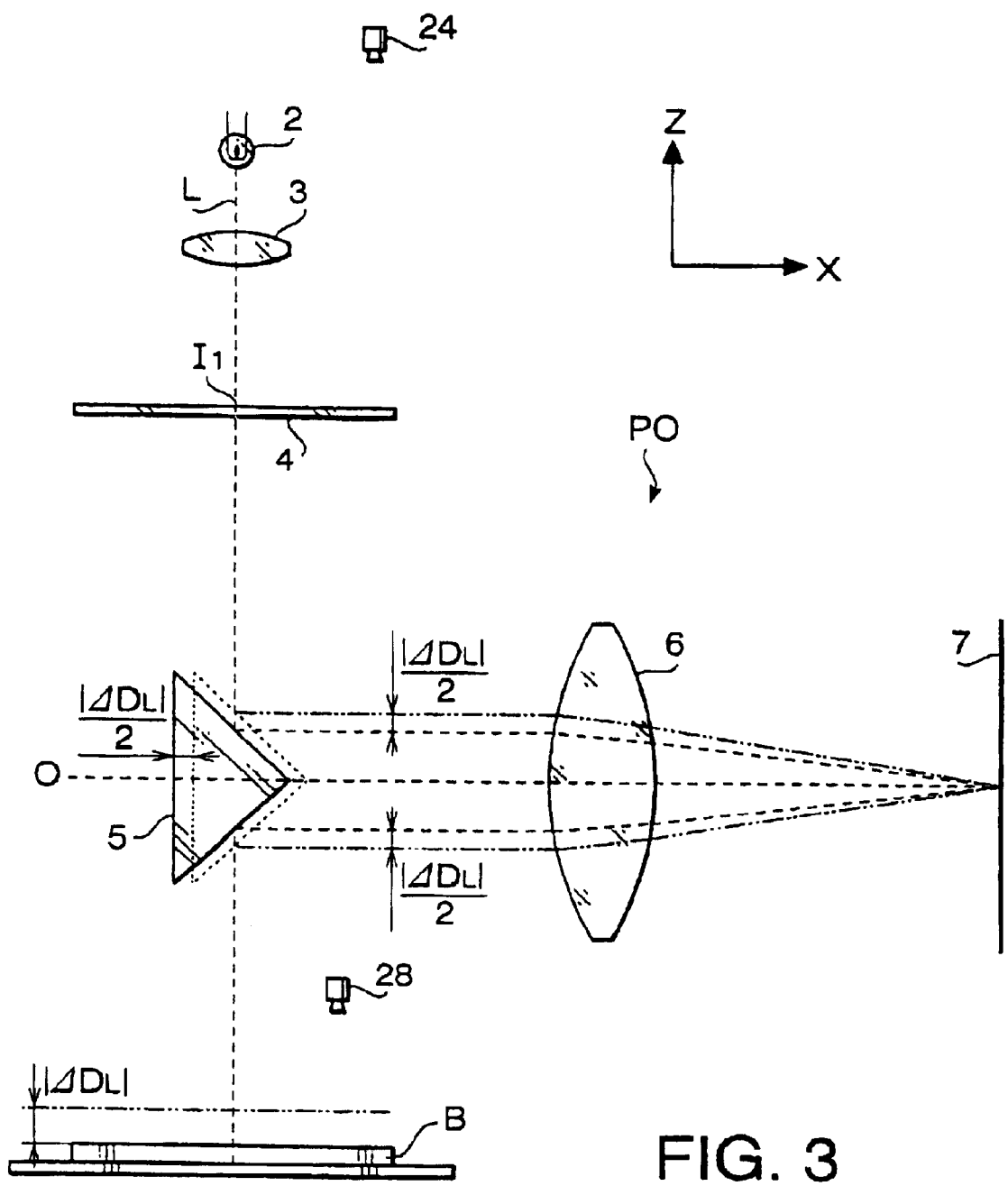
Figure 4:
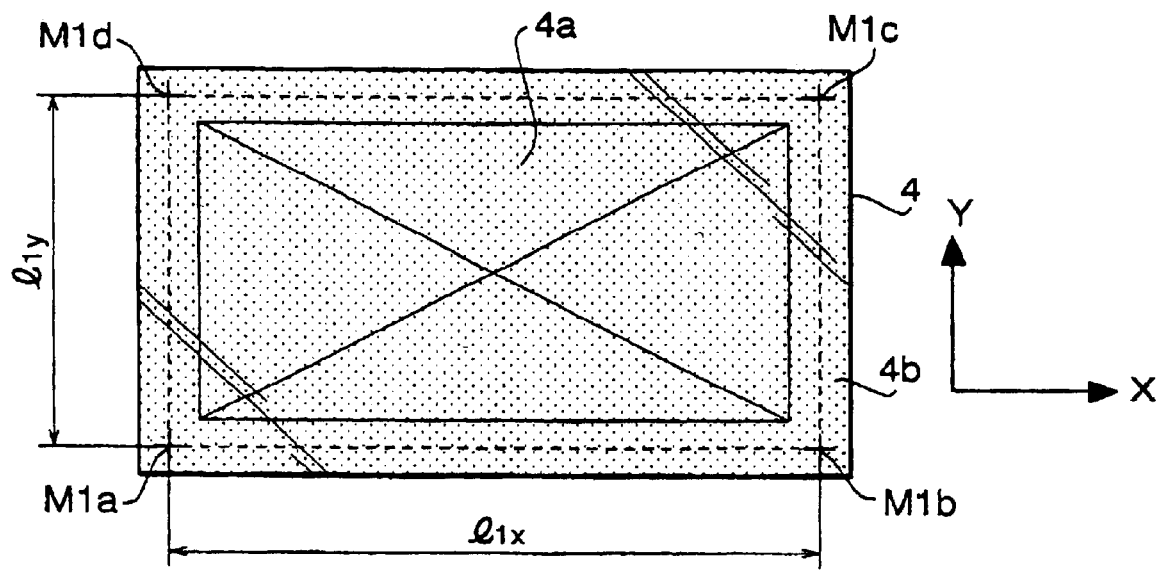
Figure 5:
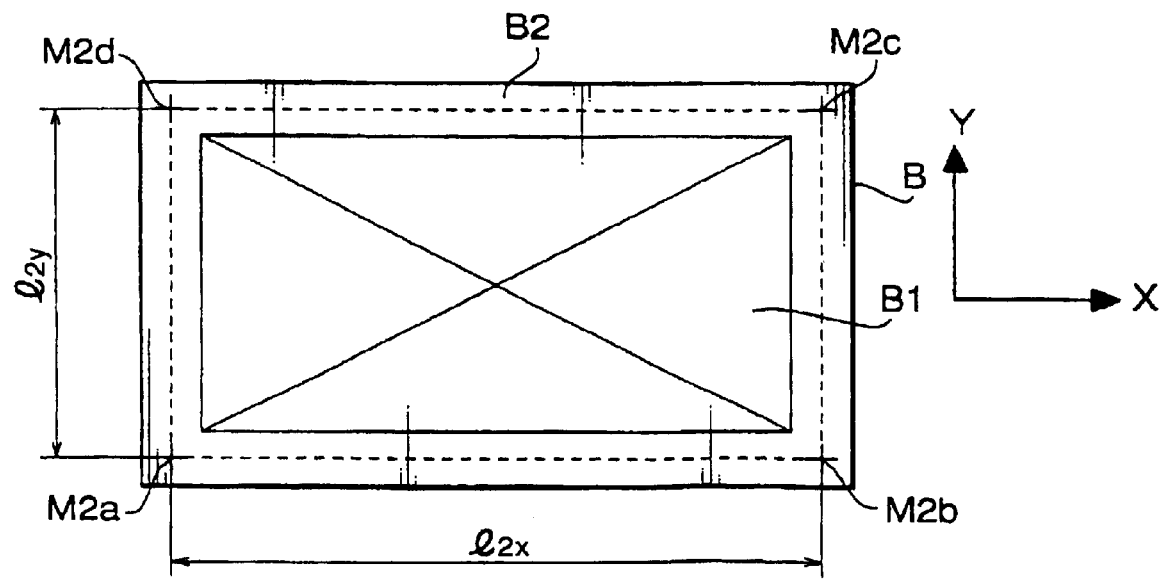
Figure 6A:
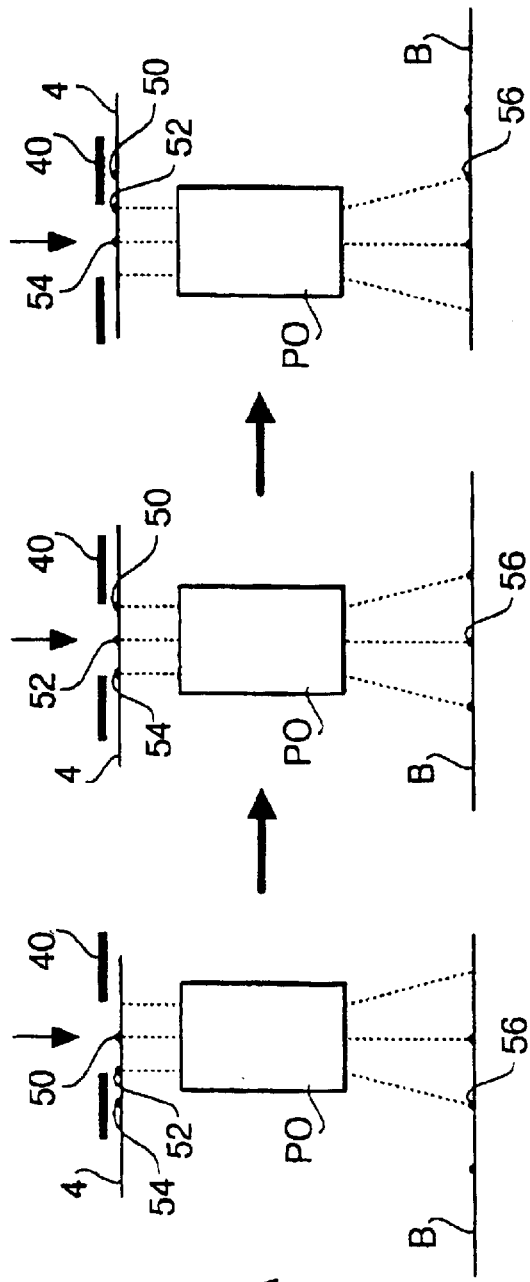
Figure 6B:
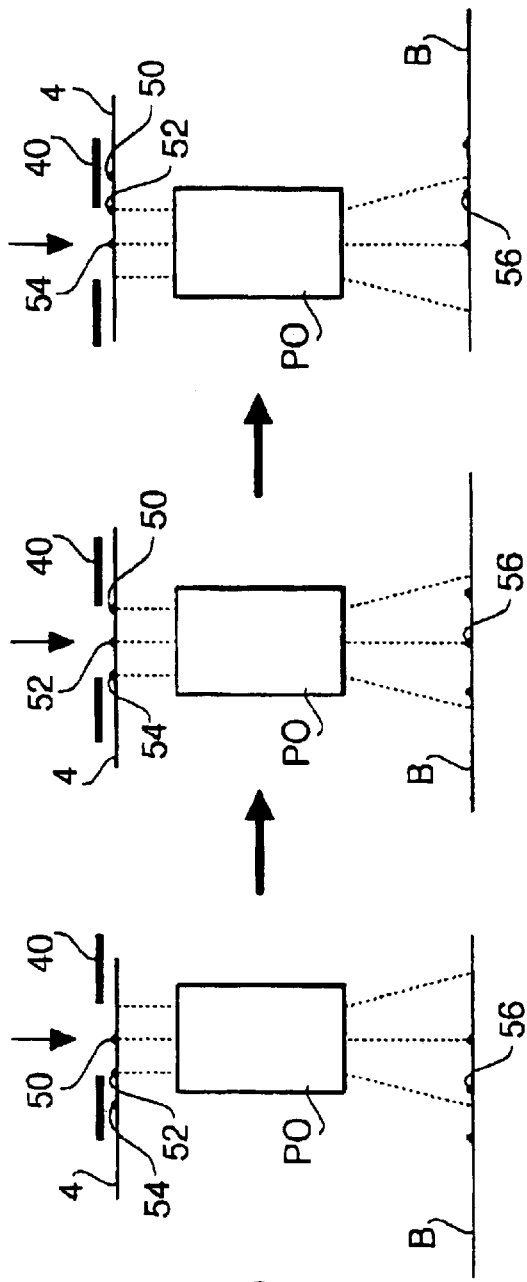
Figure 6C:
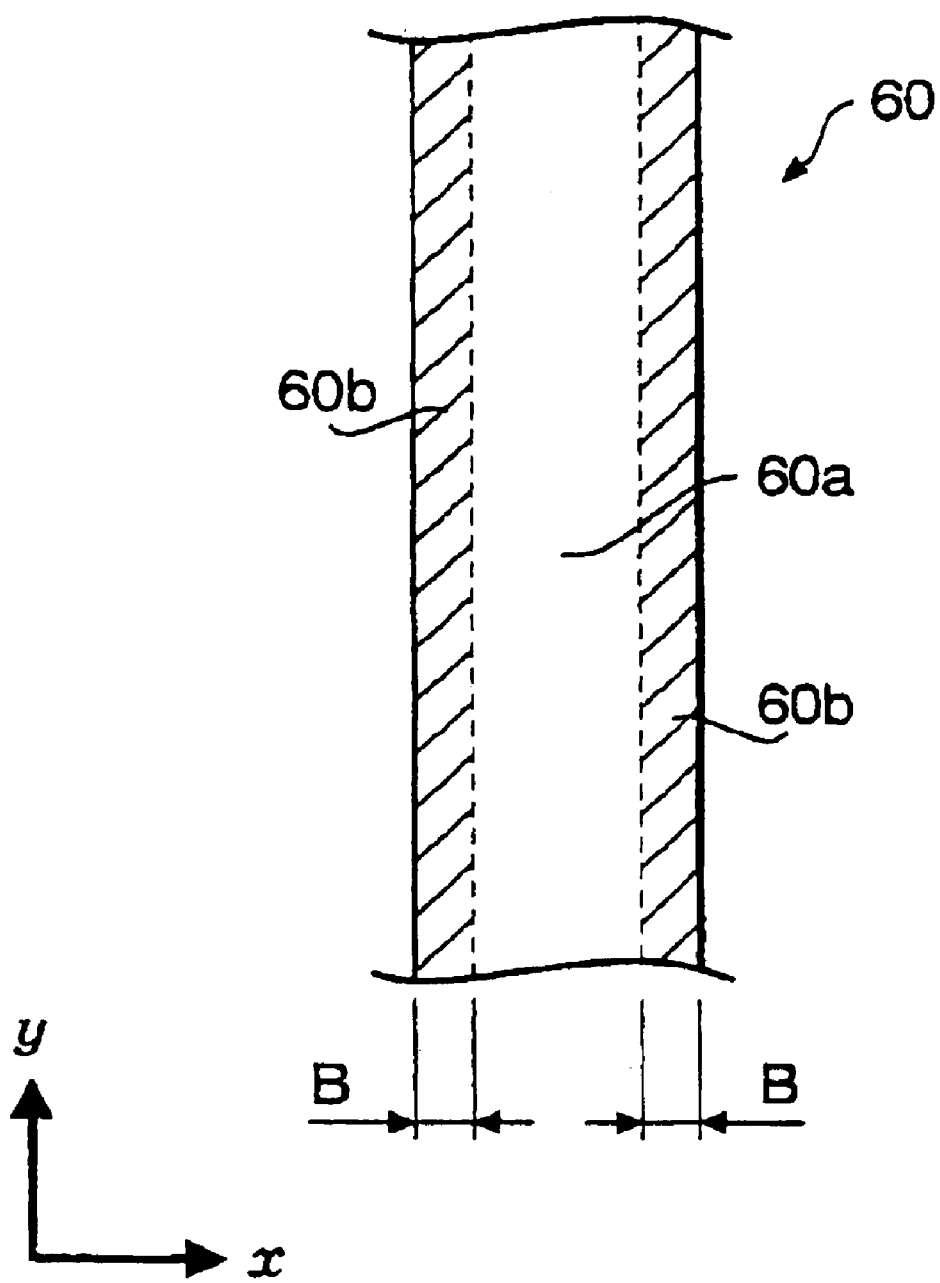
Figure 7:
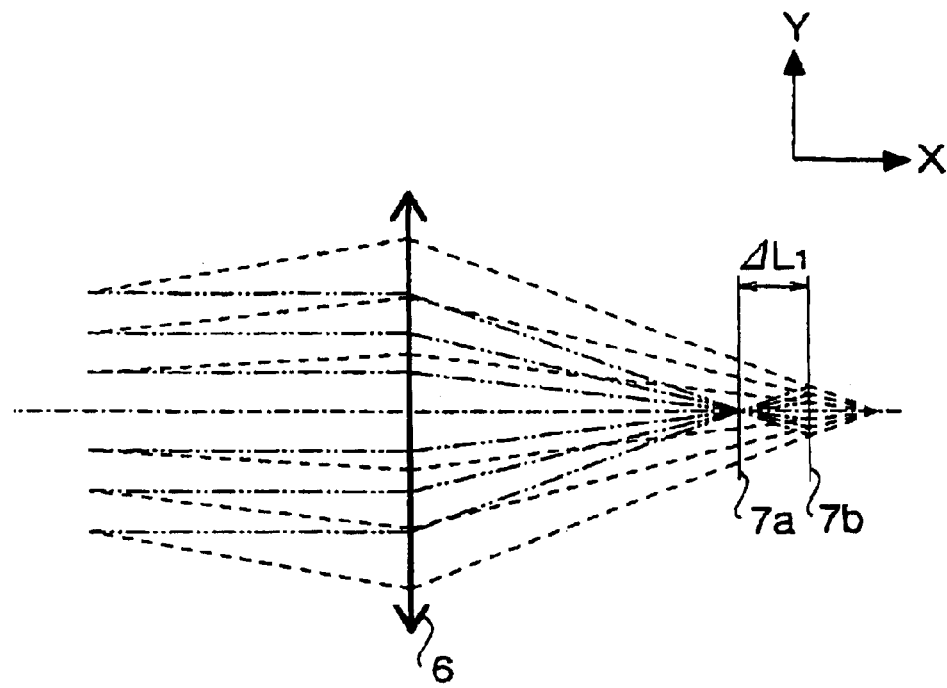
Figure 8:
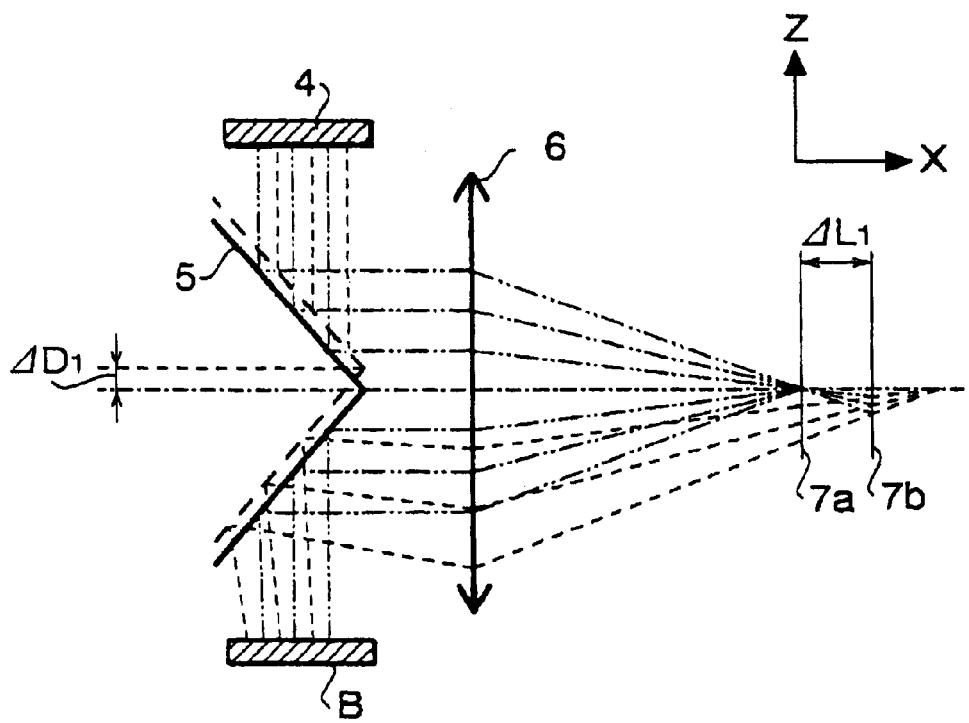
Figure 9:
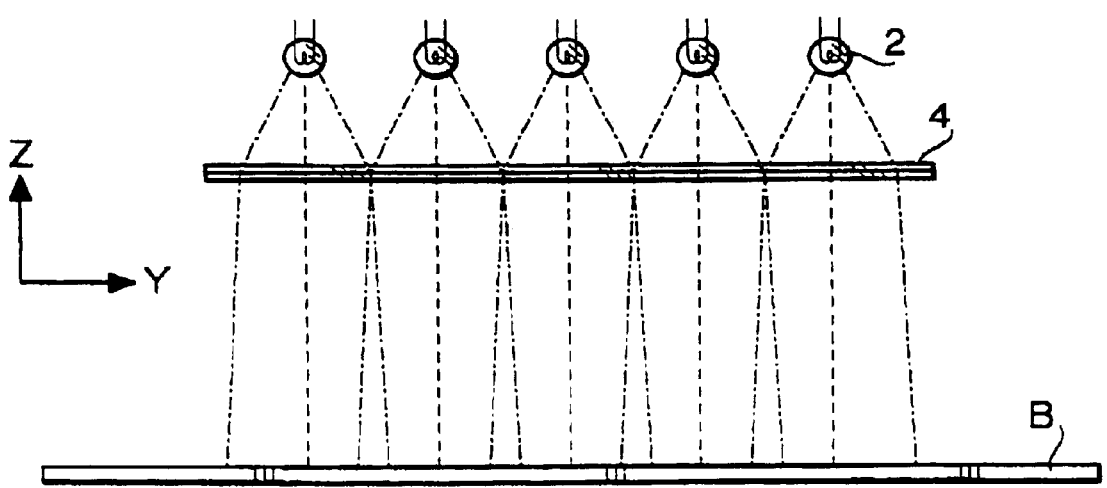
Figure 10:
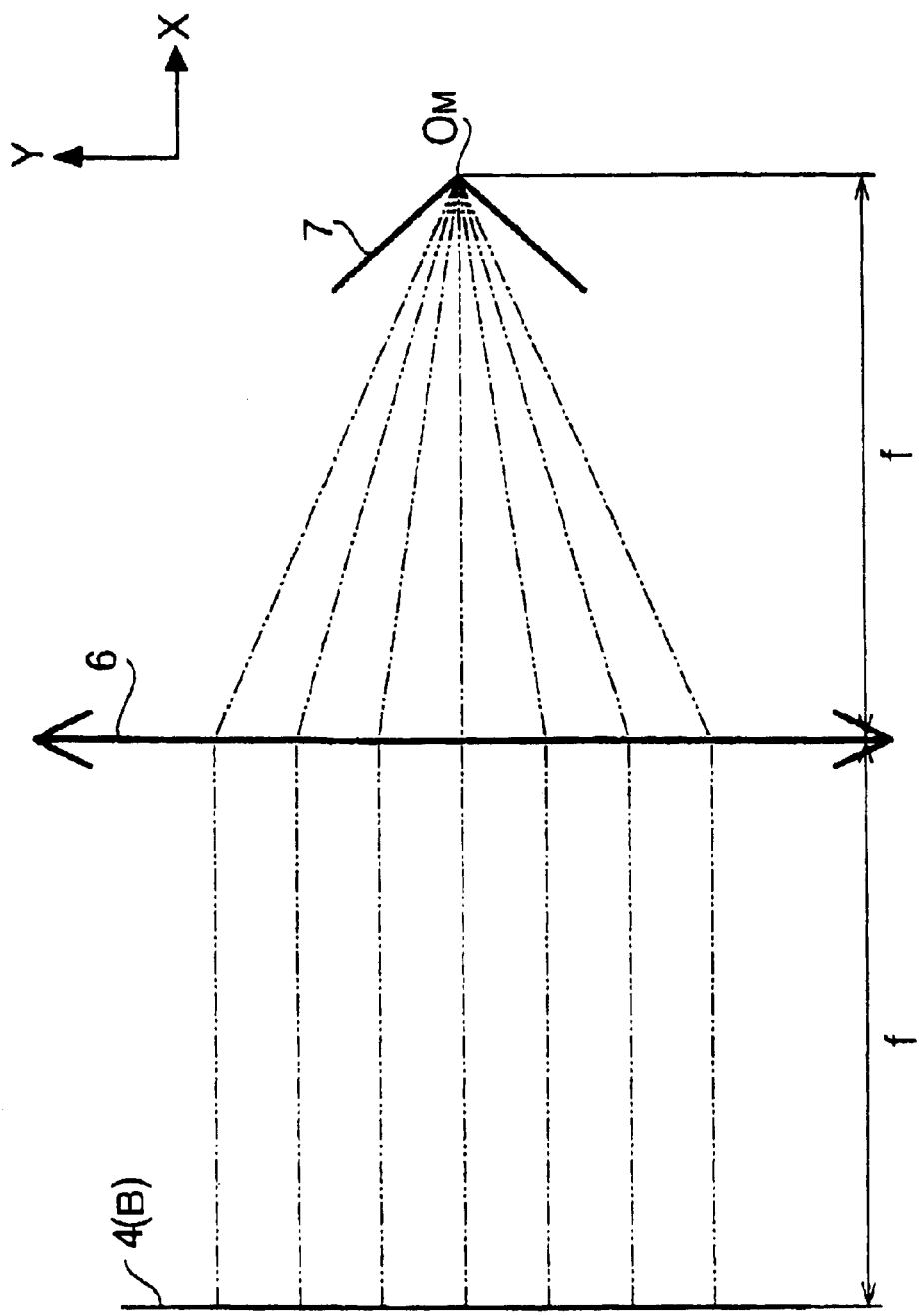
Figure 11:
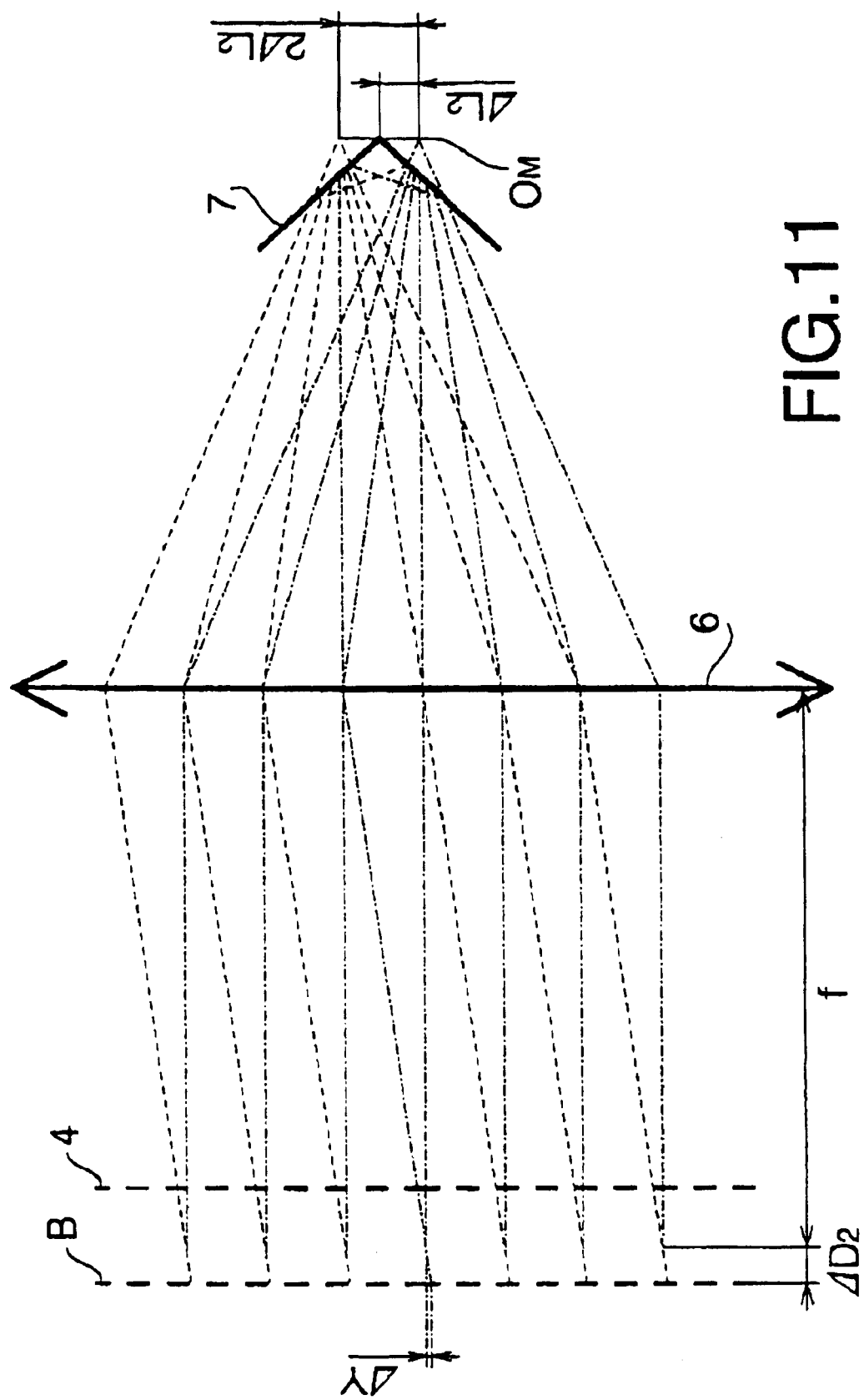
Figure 12:
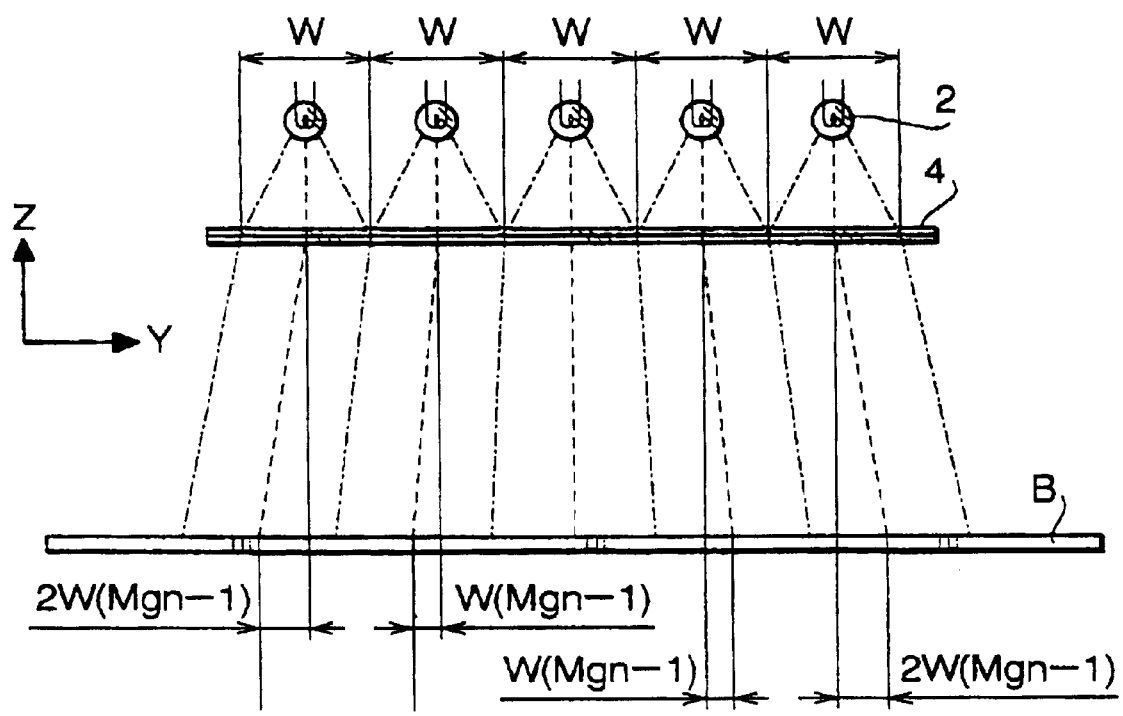

FIG. 1 schematically shows a configuration of a projection aligner according to an embodiment of the invention;

FIG. 2 schematically shows a configuration of a substrate height detecting unit of the projection aligner shown in FIG. 1;

FIG. 3 schematically shows a side view of the projection aligner of FIG. 1;

FIG. 4 schematically shows a top view of a mask of the projection aligner of FIG. 1;

FIG. 5 schematically shows a top view of a substrate to be exposed by the projection aligner of FIG. 1;

FIGS. 6A and 6B schematically illustrate the mechanism of the formation of an image on the substrate by the projection aligner 1 shown in FIG. 1;

FIG. 6C schematically shows a line formed to the photosensitive layer on the substrate by the projection aligner 1 shown in FIG. 1;

FIG. 7 schematically shows light rays passing through a lens unit and reflected by a roof mirror in the projection aligner of FIG. 1;

FIG. 8 schematically shows light rays traveling from the mask towards the substrate in the projection aligner of FIG. 1;

FIG. 9 schematically shows the light beams projected onto the substrate in the projection aligner of FIG. 1 in which projection optical systems are adjusted to enlarge the images projected onto the substrate;

FIGS. 10 and 11 schematically show the light rays traveling from the mask to the substrate in the projection aligner of FIG. 1 before and after the image location adjustment, respectively; and FIG. 12 schematically shows the light beams projected from the light sources onto the substrate in the projection aligner of FIG. 1 in which the image location adjustment is achieved.

DETAILED DESCRIPTION OF THE EMBODIMENTS

Hereinafter, a projection aligner according to an embodiment of the present invention will be described with reference to the accompanying drawings.

FIG. 1 schematically shows a configuration of a projection aligner 1 according to an embodiment of the invention. The projection aligner 1 has a plurality of light sources 2, a slit 40, a mask 4, a substrate holder 8 and a plurality of projection optical systems PO. The slit 40 has a plurality of openings 40a which allow light beams emitted from the light sources 2 passing therethrough to define the shape of each light beam. The substrate holder 8 carries a substrate B as an object to be exposed. The substrate holder 8 and the mask 4 are driven to move synchronously in the same direction for scanning of the light beams passed through the openings 40a of the slit 40.

In the following description, a direction in which the mask 4 and the substrate holder 8 move is referred to as an X-axis direction. Further, a Y-axis is defined, which is on a plane parallel to the mask 4 and perpendicular to the X-axis, and a Z-axis is defined as a direction of light beams emitted from the light sources 2 and incident on the substrate B. According to the embodiment, the light beams are perpendicularly incident on the surface of the substrate B.

Each of the projection optical systems PO corresponds to different one of the light sources 2. Each projection optical system PO includes a collimating lens 3, a mirror 5, a lens unit 6, and a roof mirror 7 that are arranged to project a portion of a mask pattern of the mask 4 onto the substrate B using the light beam emitted from the corresponding light source 2. The projection optical systems PO are arranged such that the light beams impinge on the mask in two rows in a staggered configuration which extends in the y-axis direction and such that the whole mask pattern can be transferred onto the substrate B by a single scan (i.e., only by moving the substrate B and the mask 4 in one-way). Note that the mirror 5, lens unit 6 and the roof mirror 7 of adjacent projection optical systems PO are arranged in opposite direction so that they do not interfere to each other.

The wavelength and output power of the light source 2 are determined such that the photosensitive material applied on the substrate B is sensitive to the light. An example of such a light source 2 is an ultra-high-pressure mercury-vapor lamp. Each of the light beams emitted from the light sources 2 irradiate a strip of an area on the mask 4, through the collimating lenses 3 and the slit 40. The light beams transmitted through the mask 4 are reflected by the mirrors 5.

The mirror 5 includes two reflection planes, i.e., first and second plane mirrors 5a and 5b. The mirror 5 is arranged such that the first plane mirror 5a deflects the light beam that has passed through the mask 4 toward the lens unit 6 and such that the second plane mirror 5b deflects the light beam coming from the lens unit 6 toward the substrate B.

In the present embodiment, the mirror 5 is formed in a triangular prism whose cross section on an X-Z plane is a right-angled isosceles triangle. The mirror 5 is arranged such that a normal to each of the first and second plane mirrors 5a and 5b forms 45 degrees with respect to the X-axis, and a ridge line formed by the first and second plane mirrors 5a and 5b extends in the Y-axis direction, The first plane mirror 5a reflects the light beam transmitted through the mask 4 to proceed in the X-axis direction so that the light beam is incident on the lens unit 6. The light beam passed through the lens unit 6 is reflected by the roof mirror 7 and is incident on the lens unit 6 again. The second plane mirror 5b reflects the light beam emerging from the lens unit 6 to proceed in the Z-axis direction so that the light beam is incident on the substrate B. Thus, the light beam passes through the lens unit 6 twice and forms an image of the mask pattern on the substrate B.

The lens unit 6 includes a plurality of lens elements arranged in the X-axis direction, and has a positive power as a whole.

The roof mirror 7 has a pair of mirror surfaces that are inwardly directed to form 90 degrees in the X-Y plane. The light beam emerged from the lens unit 6 is reflected by the roof mirror, 7, returns to the lens unit 6 in a direction in parallel with the incident direction in the XY-plane. The roof mirror 7 is positioned near a focal point of the lens unit 6. With this arrangement, an erect image of the pattern of the mask 4 is formed on the substrate B. A right angle prism that internally reflects the light beam by surfaces forming the right angle can be used instead of the roof mirror 7.

The projection aligner 1 is also provided with a mask-driving mechanism 14 and an object-driving mechanism 18 for synchronously moving the mask 4 and the substrate holder 8, respectively, in the x-axis direction so that the light beams emitted from the light sources 2 scan across the mask 4 and the substrate B. A mirror driving mechanism 15 is also provided for each mirror 5 for positioning the mirror 5 in both x-axis and z-axis directions. Further, a roof mirror driving mechanism 17 is provided for each roof mirror 7 for positioning the roof mirror 7 in both x-axis and y-axis directions.

The projection aligner 1 includes a mask-position, detector 24 that includes an illuminator for illuminating the mask 4 and a CCD camera for capturing the entire image of the mask 4 illuminated by the illuminator, and an object-position detector 28 that includes an illuminator for illuminating the substrate B and a CCD camera for capturing the entire image of the substrate B illuminated by the illuminator. The wavelength and light amount of the illuminators are determined to be ones to which the photosensitive material applied on the substrate B is not sensitive.

Both the mask 4 and substrate B have alignment marks near each corner thereof. A controller 10 specifies the positions of those alignment marks in the image captured by the CCD cameras and determines, from those positions, sizes of the substrate B and the mask 4 in both the beam scanning direction (x-axis direction) and the direction perpendicular to the beam scanning direction (y-axis direction). The controller 10 further determines the expansion ratio of the image of the mask pattern to be transferred onto the substrate B. Note that, each of the mask-position detector 24 and the object-position detector 28 may include a plurality of cameras each arranged to capture a small area around different one of the alignment marks to allow determination of the position of each of the alignment marks, and in turn the determination of the expansion ratio, in high accuracy.

The projection aligner 1 further includes a substrate height detecting unit 38 for detecting the position of the photosensitive surface of the substrate B in the z-axis direction.

FIG. 2 schematically shows the configuration of the substrate height detecting unit 38. The substrate height detecting unit 38 includes a laser source 38a, a photo-detector 38b, and two converging lenses 38c and 38d.

The laser source 38a emits a laser beam LB toward the photosensitive surface of the substrate B at an predetermined incident angle of θ. The wavelength and power of the laser beam LB is selected so that the laser beam LB does not expose the photosensitive material applied on the substrate B. One of the converging lens 38d is placed in front of the laser source 38a to form a beam spot on the substrate B.

The photo-detector 38b is arranged to receive the laser beam LB reflected at the substrate B. A one dimensional position sensitive detector may be utilized as the photo-detector 38b, which includes an elongated light receiving surface and being able to detect the position of the light incident thereon.

The other converging lens 38c is placed in front of the photo-detector 38b to form an image of the beam spot reflected at the substrate B on the light receiving surface of the photo-detector 38b.

The photo-detector 38b and the converging lens 38c are arranged so that the image of the beam spot is formed at the center of the light receiving surface of the photo-detector 38b when the photosensitive surface of the substrate B is located at a distance $BH_0$ from the substrate holder in the z axis direction.

In the substrate height detecting unit 38 configured as above, the position where the laser beam LB is reflected on the substrate B, and in turn the position where the beam spot is formed on the photo-detector 38b, displaces if the height of the substrate B or the position of the photosensitive surface of the substrate B in the z-axis direction changes.

The displacement in the z-axis direction of the photosensitive surface of the substrate B and the displacement of the beam spot formed on the photo-detector 38b are proportional to each other. Thus, the height BH of the photosensitive surface of the substrate B from the substrate holder 8 can be derived from the following equation:

$$BH=BH_0-(\Delta L_D/\mu)\times(\sin(\pi/2-\theta)/\sin 2(\pi/2-\theta)) \quad (1)$$

where, $\Delta L_D$ represents the displacement of the beam spot on the photo-detector 38b from the center thereon, and $\mu$ represents the magnification of the image formed on the photo-detector 38b by the converging lens 38c which is generally equal to the ratio of length of the optical path between the photo-detector 38b and the converging lens 38c, $\Lambda_2$, to that between the converging lens 38c and the photosensitive surface of the substrate B, $\Lambda_1$, that is $\Lambda_2/\Lambda_1$.

Note that a database may be provided to the projection aligner, which includes data on the relation between BH and $\Delta L_D$ that is prepared experimentally, so that the height of the photosensitive surface of the substrate B can be determined based on the data of that database instead of utilizing equation (1).

Hereinafter, the operation of the projection, aligner 1 shown in FIG. 1 will be described.

First, the projection aligner 1 adjusts the focus of the projection optical system PO to form a clear image of the mask pattern on the photosensitive surface of the substrate B. The focusing of the projection optical system PO is achieved by the following procedure.

First, the controller 10 determines the height BH of the substrate B based on the output of the substrate height detecting unit 38 and equation (1). Then, the controller 10 calculates the sum of the optical path length from the mask 4 to the lens unit 6 and that from the lens unit 6 to the photosensitive surface of the substrate B, which will be referred to hereinafter as a total optical pass length $D_L$, based on the height of the substrate, BH, and the position of the mirror 5.

The focusing of the projection optical system PO is achieved when the photosensitive surface of the substrate B is placed at a location optically conjugate to the mask 4 with respect to the lens unit 6, that is, when the total optical pass length $D_L$ is twice as long as the focal length f of the lens unit 6. The controller 10 determines whether the substrate B is at a location optically conjugate to the mask 4 or not by subtracting the double of the focusing length f of the lens unit 6 from the total optical pass length $D_L$. If the length difference $\Delta D_L$ obtained as a result of the subtraction above is not zero, then the controller 10 adjust the focusing of the projection optical system PO by operating the mirror driving mechanism 15 to move the mirror 5 in the x-axis direction.

FIG. 3 schematically shows the side view of the projection aligner 1 of FIG. 1 observed from the y-axis direction. Note that, in FIG. 3, only one of the projection optical system PO is shown and the lens unit 6 and the roof mirror 7 are indicated as a single lens and a single plane mirror, respectively, for the purpose of clarity only.

In the projection aligner 1 according to the present embodiment, the total optical pass length $D_L$ can be changed by moving the mirror 5 in the x-axis direction. As may be understood from FIG. 3, if the mirror 5 is moved for a distance of $|\Delta D_L|/2$ in the x-axis direction, both of the optical path from the mask 4 to first plane mirror 5a and the optical path from the second plane mirror 5b to the substrate B changes in length for $|\Delta D_L|/2$ since the first and second plane mirrors 5a and 5b of the mirror 5 are inclined against the x-axis at an angle of 45 degree. As a result, the total optical path length $D_L$ changes for $|\Delta D_L|$, that is, increases $|\Delta D_L|$ when the mirror 5 is moved in the direction away from the lens unit 6 and decreases $|\Delta D_L|$ if moved toward the lens unit 6.

Accordingly, if $\Delta D_L > 0$, the controller 10 moves the mirror 5 for a distance of $|\Delta D_L|/2$ toward the lens unit 6, and if $\Delta D_L < 0$, in a direction away from the lens unit 6. By moving the mirror 5 as above, the total optical path length $D_L$ becomes as long as two times of the focal length f of the lens unit 6 and, as a result, the image of the mask pattern is formed on the substrate with vivid clarity.

After the focusing of the projection optical system PO, the projection aligner 1 determines the size ratio of the substrate B to the mask 4. The size ratio of the substrate B to the mask 4 is determined based on the distances between the alignment marks formed on the substrate B and the mask 4.

FIG. 4 schematically shows a top view of the mask 4. The mask 4 has a rectangular shape and is held in the projection aligner 1 such that each side thereof is parallel to either the x-axis or the y-axis. The mask pattern is formed at a middle area of the mask 4 indicated by reference numeral 4a and will be referred to as a mask pattern area 4a in this specification. The mask pattern area 4a is surrounded by an area 4b to which no pattern is formed.

The mask 4 is provided with alignment marks M1a, M1b, M1c, and M1d. The alignment marks M1a, M1b, M1c, and M1d are formed at each corner of a virtual rectangular on the mask which is shown in broken line in FIG. 4. The virtual rectangular encloses the whole mask pattern area 4a and is defined by sides parallel to the sides of the mask 4.

The controller 10 operates the camera of the mask-position detector 24 to capture the image of the whole mask 4 and determines the lengths of the mask 4 in the beam scanning direction (x-axis direction) and in the direction perpendicular to the beam scanning direction (y-axis direction) from the positions of the marks M1a, M1b, M1c and M1d in the image obtained. More specifically, the controller 10 calculates the average of the distance between the marks M1a and M1b and the distance between the marks M1c and M1d as the length of the mask 4 in the beam scanning direction (x-axis direction), $l_{1x}$. Similarly, the controller calculates the average of the distance between the marks M1b and M1c and the distance between the marks M1a and M1d as the length of the mask 4 in the direction perpendicular to the beam scanning direction (y-axis direction), $l_{1y}$.

FIG. 5 schematically shows a top view of the substrate B. Similar to the mask 4, the substrate B normally has an elongated rectangular shape and is held by the substrate holder 8 such that its sides are parallel to the x axis and the y-axis. The middle portion of the substrate B is a pattern area B1 onto which the mask pattern is to be transferred.

The substrate B is provided with alignment marks M2a, M2b, M2c and M2d of which the positional relations, especially the distances between them, are the same as that of the alignment marks M1a, M1b, M1c and M1d of the mask 4 if the substrate B is not expanded or contracted from its original size.

The controller 10 operates the object-position detector 28 to capture the image of the whole substrate B and determines the lengths $l_{2x}$ and $l_{2y}$ of the substrate B in the beam scanning direction (x-axis direction) and the direction perpendicular to the light beam scanning direction (y-axis direction), respectively, from the positions of the marks M2a, M2b, M2c and M2d in the captured image in a similar manner to that described above in relation with the mask 4.

Next, the controller 10 calculates the size ratio of the substrate B to the mask 4 in the beam scanning direction (x-axis direction), $SR1 = l_{2x}/l_{1x}$, and that in the direction perpendicular to the beam scanning direction (y-axis direction), $SR2 = l_{2y}/l_{1y}$.

Next, the controller 10 determines the magnification of the projection optical system PO and the ratio of the velocities of the substrate B and the mask 4 moved in the x-axis direction (beam scanning direction) by the object-driving mechanism 18 and the mask driving mechanism 14, respectively.

It should be noted that, in the projection aligner 1 shown in FIG. 1, the expansion ratio in the beam scanning direction of the mask pattern image formed on the substrate B is substantially equal to the velocity ratio $\alpha$ of the substrate B and the mask 4 ($\alpha = V_B/V_M$, where $V_B$ and $V_M$ represent the velocities of the substrate B and the mask 4, respectively), and the expansion ratio of the mask pattern image in the direction perpendicular to the beam scanning direction coincides with the magnification Mgn of the projection optical system PO.

Accordingly, if the velocity ratio $\alpha = V_B/V_M$ and the magnification Mgn of the projection optical system PO are the same, the mask pattern image transferred to the substrate B is enlarged/reduced in the beam scanning direction and in the direction perpendicular to the beam scanning direction at the same ratio. If, however, $\alpha = V_B/V_M$ and Mgn have different values to each other, the mask pattern image is enlarged/reduced in those directions at different ratios. Further, in the later case, the mask pattern image transferred to the substrate becomes blurred in the beam scanning direction as will be described hereinafter.

FIGS. 6A and 6B schematically illustrate the mechanism of the formation of an image on the substrate B by means of the projection aligner 1 shown in FIG. 1. Both FIG. 6A and FIG. 6B show the mask 4 and the substrate B moving relative to the slit 40 and the projection optical system PO in a direction from left to right in the paper. In FIG. 6A, the mask 4 and the substrate B are moved such that the velocity ratio $\alpha = V_B/V_M$ is equal to the magnification Mgn of the projection optical system PO, while the velocities of the mask 4 and the substrate B are controlled such that the ratio $\alpha = V_B/V_M$ is smaller than the magnification Mgn in FIG. 6B. Further, a plurality of dots (50, 52, 54) are formed on the mask 4. The image of these dots (50, 52, 54) are transferred to the substrate B by the light beam passed through the opening 40a of the slit 40.

As shown in FIG. 6A, if the mask 4 and the substrate B are moved such that the ratio $\alpha = V_B/V_M$ is equal to the magnification Mgn of the projection optical system PO, the image of the dot 52, for example, is projected on the same point 56 of the substrate B irrespective the location of the mask 4 and the substrate B relative to the slit 40 and the projection optical system PO. Thus, a sharp image of the dot 52 will be formed on the substrate B.

On the contrary, in the case shown in FIG. 6B, the location on the substrate B on which the image of the dot 52 is projected gradually shifts in the beam scanning direction as the mask 4 and the substrate B move. As a result, the image of the dot 52 formed on the substrate B becomes blurred in the beam scanning direction and hence the whole image of the mask pattern formed on the substrate becomes also blurred in the beam scanning direction.

FIG. 6C schematically shows a line 60 formed to the photosensitive layer on the substrate B by the projection aligner 1 shown in FIG. 1 in which the ratio $\alpha = V_B/V_M$ and the magnification Mgn have different values. Note that the line 60 extends perpendicular to the beam scanning direction. As like the dot 56 formed on the substrate B of FIG. 6B, the line 60 becomes blurred in the beam scanning direction. In other words, the line has areas 60b in the vicinity of the edges that are insufficiently exposed (less exposed than a center area 60*a*). The width B of such insufficiently exposed areas 60*b* is a function of the velocity ratio α, magnification Mgn, and the width w of the opening 40*a* of the slit 40 as shown by the following equation;

$$B = |Mgn - \alpha| \times w \qquad (2)$$

Such insufficiently exposed areas 60*b* cause the width of the line finally obtained on the substrate B after development and etching of the substrate B to become thinner than it is designed. Therefore, it is required to keep the width B of the area 60*b* less than a value $B_{max}$, which is determined based on the line width of the mask pattern, to prevent the finally obtained line from becoming thinner than it is required. Thus, we obtain;

$$B_{max} \geq B = |Mgn - \alpha| \times w \qquad (3)$$

and $$B_{max}/w \geq |Mgn - \alpha| \qquad (4)$$

Equation (4) indicates that the difference between the velocity ratio α and the magnification Mgn should not exceed a value $A = B_{max}/w$ in order to keep the width of the line finally obtained on the substrate B within an allowable error from the required width. Accordingly, the controller 10 of the projection aligner 1 determines the velocity ratio $\alpha = V_B/V_M$, and the magnification Mgn of the projection optical system PO based on the size ratios SR1 and SR2 as below;

(A) if (SR1−SR2)>A, then,
   α=(SR1+SR2+A)/2
   Mgn=(SR1+SR2−A)/2
(B) if |SR1−SR2|≦A, then,
   α=SR1
   Mgn=SR2
(C) if (SR1−SR2)<−A, then,
   α=(SR1+SR2−A)/2
   Mgn=(SR1+SR2+A)/2

By determining the value of the velocity ratio α and magnification Mgn as above, the projection aligner 1 can form the mask pattern image on the substrate B without significant blur and prevent the lines of the mask pattern obtained on the substrate B after the development and etching processes from becoming unacceptably thin.

Next, the controller 10 of the projection aligner 1 adjust the magnification Mgn of the projection optical system PO to the value determined above. The adjustment of the magnification Mgn is performed by moving the roof mirror 7 and the mirror 5 in the x-axis direction and z-axis direction, respectively.

FIG. 7 schematically shows light rays passing through the lens unit 6 and reflected by the roof mirror 7 observed from the z-axis direction, and FIG. 8 schematically shows the light rays traveling from the mask 4 towards the substrate B observed from the y-axis direction. Note that, in both FIGS. 7 and 8, the lens unit 6 and the roof mirror 7 are represented as a single plane for simplification of the drawings.

In FIG. 7, the parallel light rays traveling from the mask 4 toward the lens unit 6 are indicated by chain double-dashed lines. If the roof mirror 7 reflects these light rays at the focal point of the lens unit 7 (see the plane 7*a* in FIG. 7), the light rays that have passed through the lens unit 6 again become parallel to the optical axis of the lens unit 6. However, if the roof mirror 7 is moved for a distance $\Delta L_1$ along the x-axis in a direction away from the lens unit 6 (see the plane 7*b* in FIG. 7), which corresponds to shifting the exit pupil of the lens unit 6 in the same direction for a distance $2\Delta L_1$, the light rays reflected by the roof mirror 7 declines against the optical axis of the lens unit 6 after passing therethrough (see the broken lines).

As may be understood from FIG. 8, if the light rays traveling toward the substrate B are not parallel to the optical axis of the lens unit 6, the size of the image projected onto the substrate B can be enlarged/reduced by varying the optical path length from the lens unit 6 to the photosensitive surface of the substrates B.

In the projection aligner 1 according to the present embodiment, the above-mentioned optical path length is changed by moving the mirror 5 in the z axis direction. This method is advantageous since the total optical path length $D_L$ does not change with the movement of the mirror 5 and therefore the image of the mask pattern is always clearly formed on the substrate B irrespective the scaling factor of the image. It should be also noted that the location where the optical axis of the projection optical system impinges on the substrate B does not displaces with the movement of the mirror 5 in the z-axis direction.

If the roof mirror 7 is moved to a position of which the distance from the lens unit 6 is longer than the focal length of the lens unit 6, then the image on the substrate B can be enlarged by moving the mirror 5 toward the substrate B to decrease the length of the optical path from the lens unit 6 to the substrate B, and vice versa. In contrast, if the roof mirror 7 is located between the lens unit 6 and its focal point, then the image on the substrate B can be enlarged by moving the mirror 5 away from substrate B to increase the length of the optical path between the lens unit and the substrate B, and vice versa.

The displacement $\Delta L_1$ of the roof mirror 7 in the x-axis direction from the focal point of the lens unit 6 and the displacement $\Delta D_1$ of the mirror 5 in the z-axis direction from the location at where the optical path length from the lens unit 6 to the substrate B is the same as the focal length of the lens unit 6 should satisfy the following relation to adjust the magnification of the projection optical system to Mgn:

$$(Mgn - 1) = -2 \times \Delta D_1 \times \Delta L_1 / f^2 \qquad (5)$$

Thus, the controller 10 positions the roof mirror 7 and the mirror 5 so that the equation (5) is satisfied.

FIG. 9 schematically shows the light beams projected from the light sources 2 onto the substrate B in the projection aligner 1 in which the projection optical systems are adjusted to enlarge the images projected onto the substrate B. Note that the collimating lenses 3, the mirrors 5, the lens units 6 and the roof mirrors 7 are omitted in FIG. 8 for the simplification of the drawing.

As described above, the projection optical system in the projection aligner 1 of the present embodiment is able to enlarge/reduce the image projected onto the substrate B by shifting the roof mirror 7 and the mirror 5 in x-axis and z-axis directions, respectively. However, when the plurality of the projection optical systems enlarge or reduce the images, the images on the substrate B overlap to each other or gaps appear between the images.

Since such overlapping of the images and gaps between the images inhibit correct transfer of the mask pattern onto the substrate B, the locations of the images projected onto the substrate B are adjusted in the y-axis direction so that such overlapping or gaps do not occur. In the projection aligner 1 according to the present embodiment, the above-mentioned adjustment, which will be referred hereinafter as "image location adjustment", is achieved by moving the roof mirror 7 in y-axis direction as well as moving the mirror 5 in z-axis direction.

FIGS. 10 and 11 schematically shows the light rays traveling from the mask 4 to the substrate B. In particular, FIG. 10 shows the light rays in the projection aligner 1 in which the image location adjustment is not yet performed. FIG. 11 shows the light rays in the projection aligner 1 in which the image location adjustment is performed. In FIG. 11, the chain double-dashed lines represent the light rays traveling toward the roof mirror 7 and the broken lines the light rays traveling toward the substrate B after being reflected by the roof mirror 7. Note that the lens unit 6 is represented as a single plane and the mirror 5 is omitted in both FIGS. 10 and 11 for simplifying the drawings.

In FIG. 10, the mask 4 and the photosensitive surface of the substrate B are both located at a distance from the lens unit 6 equal to the focal length thereof. The roof mirror 7 is located at the focal point $O_M$ of the lens unit 6. In FIG. 10, the light rays that travel from the mask 4 toward the lens unit 6 enter the lens unit 6 in parallel to the optical axis thereof. After passing through the lens unit 6, the light rays are reflected by the roof mirror 7, pass through the lens unit 6 again, and travel in parallel to the optical axis of the lens unit 6. Accordingly, the location on the substrate B where the image is projected by those light rays does not change even if the optical path length from the lens unit 6 to the substrate B is varied by moving the mirror 5 (which is, omitted in FIG. 9).

If the roof mirror 7 is moved, as shown in FIG. 11, in the y-axis direction for a distance $\Delta L_2$ from the focal point $O_M$ (or from the optical axis of the lens unit 6), the position of the exit pupil of the lens unit 6 moves for $2\Delta L_2$ from the focal point $O_M$ in the same direction. As a result, the light rays reflected by the roof mirror 7 inclines against the optical axis of the lens unit 6 after passing therethrough.

Accordingly, if the optical path length from the lens unit 6 to the substrate B is changed by shifting the mirror 5 in the z-axis direction, the location on the substrate B where the image is formed displaces in the y-axis direction. The displacement of the image in the y-axis direction $\Delta Y$ is related to displacement of the mirror 5 in the z-axis direction $\Delta D_2$, or the amount of change of the optical length from the lens unit 6 to the substrate B, and the displacement of the roof mirror 7 in y-axis direction $\Delta L_2$ by the following equation:

$$\Delta Y = -\Delta D_2 \times 2\Delta L_2 / f \quad (6)$$

Note that $\Delta D_2$ in equation (6) should be equal to $\Delta D_1$ of equation (5) since both $\Delta D_1$ and $\Delta D_2$ represent the displacement of the mirror 5 in the z-axis direction.

The displacement $\Delta Y$ for the image projected by the a-th projection optical system from the most left or right one in FIG. 11 is determined from the following equation:

$$\Delta Y = (a - (n_L + 1)/2) \times (Mgn - 1) \times W \quad (7)$$

where $n_L$ is the total number of the projection optical systems included in the projection aligner 1, and constant number W is the length in the y-axis direction of the unmagnified image projected onto the substrate B by one projection optical system.

In the projection aligner 1 according to the present embodiment, the controller 10 determines the displacement $\Delta L_2$ of the roof mirror 7 in the y-axis direction so that the equations (6) and (7) are satisfied.

FIG. 12 schematically shows the light beams projected from the light sources 2 onto the substrate B in the projection aligner 1 in which the image location adjustment is performed. Note that the collimating lenses 3, the mirrors 5, the lens units 6 and the roof mirrors 7 are omitted in FIG. 12 for simplifying the drawing.

As shown in FIG. 12, the location of the image formed by the projection optical system at the center does not shifts in the y-axis direction, while the image formed by the n-th projection optical system counted from the one at the center shifts for a distance W(Mgn−1)×n. As a result, the images projected onto the substrate B do not overlaps to each other and no gaps appear between the images. Thus, the image location adjustment of the projection aligner 1 allows correct transfer of the mask pattern onto the substrate B.

After the magnifications of the projection optical systems are adjusted and the image location adjustment is performed as above, the controller 10 operates the mask-driving mechanism 14 and the object-driving mechanism 15 to synchronously move the mask 4 and the substrate B in the x-axis direction to scan the light beams L from the light sources 2 across the mask 4 and the substrate B. The controller 10 moves the mask 4 at a predetermine velocity $V_M$ and the substrate B at a velocity $V_B = \alpha \times V_M$. In addition, the controller 10 moves the mask 4 and the substrate B such that the image at the center of the mask pattern area 4a is transferred on the center of the pattern area B1 of the substrate B.

By operating the projection aligner 1 according to the present embodiment of the invention as above, the mask pattern of the mask 4 is transferred onto the substrate B without having significant displacement between the transferred pattern and the through holes formed to the substrate B.

It should be noted that the embodiment of the invention described above may be modified in various ways. For example, the substrate height detecting unit 38 may also be arranged such that the laser beam LB emitted from the laser source 38a impinges on the photosensitive surface of the substrate B in the vicinity of where one of the light beams from the light sources 2 strikes the substrate B. In this case, the controller 10 may monitor the output of the substrate height detecting unit 38 during the exposure of the substrate B, and control the position of the mirrors 5 in the x-axis direction so that the total optical path length $D_L$ satisfies the condition $D_L = 2f$ substantially all the time during the exposure. With this, the projection aligner 1 becomes able to correctly transfer the mask pattern on a substrate even if the substrate has uneven thickness.

The present disclosure relates to the subject matter contained in Japanese Patent Application No. P2002-005409, filed on Jan. 11, 2002 which is expressly incorporated herein by reference in its entirety.

What is claimed is:

1. A projection aligner for transferring an image of a pattern formed on a mask to an object to be exposed by scanning a light beam across the mask and the object, said projection aligner comprising:

a projection optical system that projects the light beam passed through the mask onto the object;

a magnification adjusting mechanism that adjusts the magnification of said projection optical system;

a driving mechanism that moves the mask and the object synchronously so that the light beam scans across the mask and the object in a predetermined beam scanning direction; and a controller that controls said magnification adjusting mechanism and said driving mechanism to keep a difference between the magnification of said projection optical system and a velocity ratio of the mask and the object moved by said driving mechanism below a predetermined maximum value, said maximum value being determine based on a line width of the pattern formed on the mask.

2. A projection aligner according to claim 1, wherein said controller controls said magnification adjusting mechanism and said driving mechanism to adjust said velocity ratio $\alpha$ of the mask and the object and said magnification Mgn of said projection optical system to;

(i) (SR1+SR2+A)/2 and (SR1+SR2−A)/2, respectively, when (SR1−SR2)>A (ii) SR1 and SR2, respectively, when |SR1−SR2|≦A (iii) (SR1+SR2−A)/2 and (SR1+SR2+A)/2, respectively, when (SR1−SR2)<−A where SR1 and SR2 represent size ratios of the object to the mask in said beam scanning direction and a direction perpendicular to said beam scanning direction, respectively, and A represents said predetermined maximum value.

3. The projection aligner according to claim 2, further comprising first and second cameras that capture images of the object and the mask, respectively, and wherein said controller calculates said size ratios from the images captured by said first and second cameras.

4. The projection aligner according to claim 3, wherein each of the mask and the object is provided with at least two first marks arranged thereon along said beam scanning direction and at least two second marks arranged thereon along said direction perpendicular to said beam scanning direction, and wherein said controller measures the size of each of the mask and the object in both said beam scanning direction and said direction perpendicular to said beam scanning direction based on the positions of said first and second marks in the images captured by said first and second cameras.

5. The projection aligner according to claim 1, wherein said projection optical system includes:

a lens unit having a positive power;

a first mirror that deflects the light beam passed through the mask toward said lens unit;

a reflector that reflects back the light beam deflected by said first mirror and passed through said lens unit; and a second mirror that deflects the light beam reflected by said reflector and passed through said lens unit toward the object, and wherein said magnification adjusting mechanism includes:

a reflector driving mechanism that moves said reflector along an optical axis of said lens unit;

a mirror driving mechanism that moves said first and second mirrors toward and away from the object.

6. The projection aligner according to claim 5, wherein said first and second mirrors are integrated in a single member.

7. The projection aligner according to claim 6, comprising a triangle prism whose section is an isosceles right triangle, said first and second mirrors being formed on side surfaces of said triangle prism forming a right angle.

8. The projection aligner according to claim 5, wherein said reflector is located in the vicinity of a focal point of said lens unit.

9. The projection aligner according to claim 5, wherein said reflector is a roof mirror whose reflection surfaces are arranged perpendicular to said mask.

10. The projection aligner according to claim 5, wherein said reflector is a rectangular prism that internally reflects the light beam by rectangular surfaces thereof, said rectangular surfaces being arranged perpendicular to said mask.

* * * * *